United States Patent [19]

Oshio et al.

[11] Patent Number: 4,937,033
[45] Date of Patent: * Jun. 26, 1990

[54] METHOD OF FORMING PROTECTIVE LAYER ON CONCRETE OR MORTAR

[75] Inventors: Akira Oshio, Saitama; Kazumi Jimbo, Matsudo; Shoji Shirokuni, Funabashi, all of Japan

[73] Assignee: Onoda Cement Co., Ltd., Yamaguchi, Japan

[*] Notice: The portion of the term of this patent subsequent to Jun. 26, 2007 has been disclaimed.

[21] Appl. No.: 279,291

[22] Filed: Nov. 30, 1988

Related U.S. Application Data

[63] Continuation of Ser. No. 892,505, Aug. 1, 1986, abandoned.

[30] Foreign Application Priority Data

Aug. 6, 1985 [JP] Japan ................ 60-172954
May 22, 1986 [JP] Japan ................ 61-116122

[51] Int. Cl.⁵ .................. B28B 1/16; B28B 7/10; B29C 41/42
[52] U.S. Cl. .................. 264/256; 264/334
[58] Field of Search ........... 264/256, DIG. 57, 333, 264/334

[56] References Cited

U.S. PATENT DOCUMENTS

| | | | |
|---|---|---|---|
| 1,729,172 | 9/1929 | Lundin | 264/256 |
| 2,070,596 | 2/1937 | Hansen | 264/255 |
| 3,439,076 | 4/1969 | Loois | 264/256 X |
| 3,619,457 | 11/1971 | Chandler et al. | 264/DIG. 57 |
| 3,905,929 | 9/1975 | Noll | 524/839 |
| 3,929,706 | 12/1975 | Schmidt et al. | 524/825 |
| 3,941,864 | 3/1976 | Bosch et al. | 264/256 |
| 4,036,839 | 7/1977 | Plunguia et al. | 264/256 |
| 4,049,874 | 9/1977 | Aoyama et al. | 264/256 X |
| 4,060,581 | 11/1977 | Darby et al. | 264/256 X |
| 4,088,808 | 5/1978 | Cornwell et al. | 264/256 X |
| 4,115,316 | 9/1978 | Burke, Jr. | 528/501 X |
| 4,177,232 | 12/1979 | Day | 428/703 X |
| 4,213,926 | 7/1980 | Toyoda et al. | 264/256 X |
| 4,350,739 | 9/1982 | Mohiuddin | 264/255 X |
| 4,356,230 | 10/1982 | Emanuel et al. | 264/255 X |
| 4,428,994 | 1/1984 | Rawlins | 428/703 X |

(List continued on next page.)

FOREIGN PATENT DOCUMENTS

| | | | |
|---|---|---|---|
| 146915 | 3/1981 | Fed. Rep. of Germany | 428/703 |
| 1322174 | 2/1963 | France | 264/256 |
| 9118 | 1/1976 | Japan | 264/256 |
| 1009118 | 1/1976 | Japan | 264/256 |
| 12233 | 1/1977 | Japan | 428/703 |
| 26523 | 2/1977 | Japan . | |
| 54718 | 5/1977 | Japan | 428/703 |
| 0065518 | 5/1977 | Japan | 264/256 |
| 65518 | 5/1977 | Japan . | |
| 16051 | 2/1978 | Japan | 428/703 |
| 14417 | 6/1979 | Japan | 428/703 |
| 85763 | 6/1980 | Japan | 428/703 |
| 59-224730 | 12/1984 | Japan . | |
| 60-56505 | 4/1985 | Japan . | |
| 571626 | 1/1976 | Switzerland | 264/256 |

OTHER PUBLICATIONS

Treatise on Coatings, vol. 4 (In Two Parts), Formulations, Part I (Edited by Raymond R. Myers and J. S. Long).

(List continued on next page.)

Primary Examiner—Jan H. Silbaugh
Assistant Examiner—Karen D. Kutach
Attorney, Agent, or Firm—Frishauf, Holtz, Goodman & Woodward

[57] ABSTRACT

A protective layer is formed on concrete or mortar by coating a strippable paint on the inner surface of a mold, to form a strippable membrane. A transferring layer is then formed on the strippable membrane, and concrete or mortar is placed in the mold having the strippable membrane and the transferring layer. The concrete or mortar is cured in the mold. Then, the mold is removed from the cured concrete or mortar, thereby allowing the strippable membrane to transfer onto the surface of the cured concrete or mortar.

8 Claims, 1 Drawing Sheet

U.S. PATENT DOCUMENTS

| | | | |
|---|---|---|---|
| 4,435,472 | 3/1984 | Leah | 428/703 X |
| 4,476,657 | 10/1984 | Juba et al. | 264/256 X |
| 4,507,365 | 3/1985 | Lower et al. | 428/703 X |
| 4,536,417 | 8/1985 | Shimizu | 427/140 |
| 4,634,626 | 1/1987 | Yamaguchi et al. | 428/703 X |

OTHER PUBLICATIONS

Treatise on Coatings, vol. 1 (Part II) Film-Forming Compositions (edited by Raymond R. Myers and J. S. Long).

UCAR Solution Vinyl Resins for Coatings–Union Carbide.

Chemical Abstracts, vol. 64, 1966–48–Plastics Technology, p. 6834, "Mechanics of Peeling".

Mechanics of Peeling, II. Time–Temperature Superposition Principle in the Breaking of Adhesion, Toshio Hata et al., Kobunshi Kagaku 22(239) 160–5 (1965).

Strippable Coatings, Y. M. Chandhok and S. N. Agarwal, Paint Manufacture, Jul. 1970.

Protective Coatings for Metals (3rd Ed.), R. M. Burns and W. W. Bradley, Reinhold Publishing Corp.

Guide to United States Government Paint Specifications, 15th Ed., Nat'l Paint, Varnish & Lacquer Assoc., Inc., Jun. 1958.

METHOD OF FORMING PROTECTIVE LAYER ON CONCRETE OR MORTAR

This application is a continuation of application Ser. No. 06/892,505, filed Aug. 1, 1986, now abandoned.

BACKGROUND OF THE INVENTION

1. Field of the Invention

The present invention relates to a method of forming a protective layer on a concrete or mortar surface.

2. Description of the Prior Art

Concrete structures are, in general, constructed by assembling a mold, arranging reinforcing steel in the mold, and placing concrete in the mold. The inserted concrete is then cured by wet curing or sealed curing. The curing methods are performed in accordance with, for example, the standards of the Japan Society of Civil Engineers and the Architectural Institute of Japan. According to these standards, in wet curing, the exposed concrete surface is covered with wet cloth, sand, or the like during curing. In sealed curing, the exposed concrete surface is covered with an air impermeable sheet or coating so as to prevent water evaporation during curing.

Wet curing can be performed relatively easily. The side and bottom surfaces of the concrete mass are preferably kept in the mold as long as possible. However, in practice, in order to increase the work rate of molds or to shorten the construction period, the molds are removed at relatively early stages, leading to early age drying of the concrete. When the concrete is subjected to the drying at an early age, the strength and elastic modulus of the concrete greatly decreases and the degree of drying shrinkage becomes large.

The reinforcing steel in reinforced concrete is in a highly alkaline state when in the concrete and does not corrode easily. However, on a long term basis, the concrete itself is neutralized by carbon dioxide gas in the air. When the neutralization of the concrete reaches the reinforcing steel, the steel then corrodes. In seashore concrete structures, salt from sea winds or splashes of sea water become attached to the concrete surface and permeate into the concrete When the reinforcing steel in the concrete is corroded and expands due to rusting, the concrete may separate or crack. Concrete also cracks by drying shrinkage. The durability of concrete is thus significantly degraded by water, salt, or oxygen permeating into the concrete through such cracks.

Various conventional methods have been adopted as countermeasures against such degradation in the durability of reinforced concrete. For example, the curing time is prolonged, the volume of concrete covering the reinforcing steel is increased, or the water-cement ratio is limited. In addition, reinforcing steel is coated with an epoxy resin, the concrete surface is coated with a water-impermeable or resistant-to-corrosion resin, or a polymer cement having improved durability is used. However, in the method of coating reinforcing steel with an epoxy resin, the cost is increased and pinholes form easily in the resin coating. In addition, the adhesion strength between the reinforcing steel and concrete is reduced to about 20% upon formation of such a resin coating. In the method of coating a concrete surface with a resin or the like, prior to coating the resin, gaps in the concrete surface must be filled with mortar or putty, or a primer treatment must be performed, thus prolonging the construction period. In addition, the coating itself generally suffers from the problem of unsatisfactory durability, and fails to protect the concrete over a long period of time. When a polymer cement is used as the main raw material for a concrete structure, the durability is improved but the cost greatly increases.

SUMMARY OF THE INVENTION

It is, therefore, an object of the present invention to provide a method of forming a protective layer or membrane on concrete or mortar, wherein a mold can be removed at a relatively early stage after inserting the concrete or mortar, and the concrete or mortar can be protected from environmental influences after removal of the mold.

In order to achieve the above object of the present invention, a method is provided of forming a protective layer on concrete or mortar, comprising:

coating a strippable paint on the inner surface of a mold to form a strippable membrane;

forming a transferring layer on the strippable membrane;

placing concrete or mortar in the mold having the strippable membrane and the transferring layer;

curing the concrete or mortar in the mold; and removing the mold from the cured concrete or mortar, thereby allowing the strippable membrane to transfer onto the surface of the cured concrete or mortar.

DESCRIPTION OF THE PREFERRED EMBODIMENTS

The present invention will now be described in detail with reference to the accompanying drawings.

Figure 1:
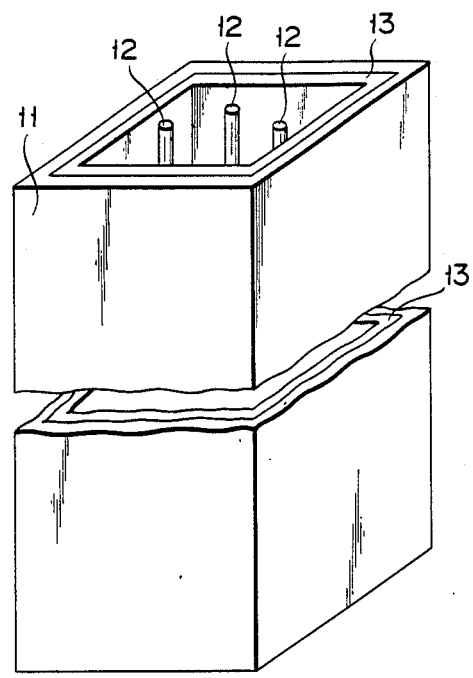
FIGS. 1 to 4 are perspective views for explaining the method of the present invention.

Referring to FIG. 1, a strippable paint is coated on the inner surface of mold 11 formed of wood or steel and having reinforcing steel 12 placed therein. Strippable membrane 13 is thus formed. The strippable paint used in the present invention is one which can form a continuous strippable membrane on a product surface upon being coated on such a surface. Such strippable paints have been generally applied so far for temporary protection of product surfaces in order to prevent abrasion or corrosion of the products during transportation or storage. Therefore, after transportation or storage, the strippable membranes are usually stripped. A strippable membrane formed by coating such a strippable paint generally has a weak adhesion strength to the coated product surface but has excellent continuity. In addition, although the membrane is relatively soft, it is tough and can be continuously stripped from the coated surface. Using such properties of a strippable paint, according to the present invention, the paint is coated on the inner surface of mold 11, so as to form a strippable membrane 13 thereon. Strippable paints harden in about 1 hour after coating, although the hardening times vary slightly depending upon the type of paint. However, in order to guarantee the membrane strength, the membrane is preferably left to stand for 2 to 4 hours or more after coating. A strippable paint to be used herein is known per se, and its main component is a resin component such as vinyl chloride, polyvinyl chloride, vinyl chloride-vinyl acetate copolymer, polyvinyl butyral, polyvinyl alcohol, ethylene-vinyl acetate copolymer, or acrylic. The strippable paint can be coated on the inner surface of mold 11 by spraying or using a brush. The strippable membrane 13 preferably has a thickness of 10 $\mu$m to 100 $\mu$m. When the inner surface of mold 11 is a wood surface, in order to allow easy stripping of membrane 13 from the mold inner surface, the strippable paint is preferably coated after a releasing agent (e.g., machine oil or the like) has been coated on the mold surface.

Figure 2:
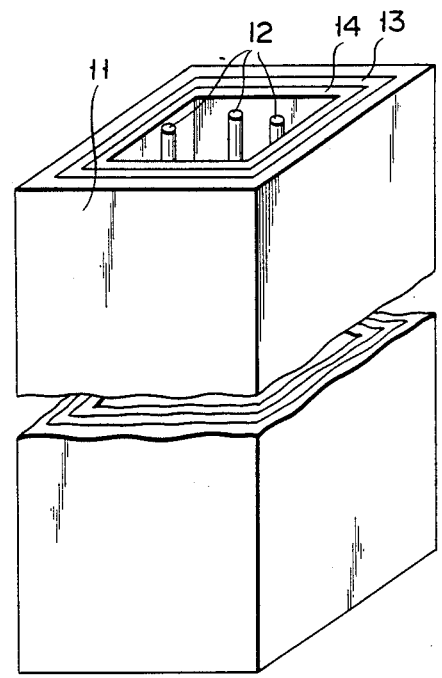

After strippable membrane 13 forms, transferring layer 14 is coated on the entire surface of membrane 13 (FIG. 2). Transferring layer 14 serves to allow transfer of strippable membrane 13 on the inner surface of mold 11 onto the concrete or mortar surface upon removal of mold 11. Transferring layer 14 therefore also serves as an adhesive agent between strippable membrane 13 and the concrete or mortar surface. The transferring layer is preferably a coated layer of a high-polymer emulsion or a high-polymer dispersion, or a layer of mortar containing such a high-polymer emulsion or dispersion.

Examples of a high-polymer emulsion or dispersion may include ethylene-vinyl acetate-vinyl chloride copolymer emulsion, acrylic ester-styrene copolymer emulsion, ethylene-vinyl acetate copolymer emulsion, acrylic ester emulsion, anionic-polymerized styrene butadiene rubber latex, cationic-polymerized styrene-butadiene copolymer emulsion, paraffin latex, asphalt emulsion, rubber asphalt emulsion, epoxy resin emulsion, nitrile rubber latex, natural rubber latex, chloroprene latex, and methyl methacrylate latex.

When the strippable membrane is not going to be removed after curing of the concrete, the transferring layer is preferably formed of a material having a high adhesion strength, such as an ethylene-vinyl acetate copolymer emulsion. When the strippable membrane is going to be removed after curing of the concrete, the transferring layer is preferably formed of a material having a low adhesion strength, such as natural rubber latex.

A high-polymer emulsion or dispersion selected from those enumerated above can be mixed in mortar to prepare transferring layer 14. Mortar used in this case is a mixture of aggregate and cement in a weight ratio of, preferably, 75 : 25 to 45 : 55. The amount of high-polymer emulsion or dispersion to be mixed in the mortar is preferably 2.0 to 8.0% by weight (solid content) based on the weight of the mortar. Mortar containing a high-polymer emulsion or dispersion has excellent bending strength, high adhesion strength, low water absorption, high water impermeability, and high resistance to permeation of chlorine ion as compared to regular mortar, and its use is particularly preferred in the manufacture of cement products which are subjected to the effects of sea water.

When transferring layer 14 formed of mortar containing a high-polymer emulsion or dispersion is formed on strippable membrane 13, it is formed using a trowel or roller, or by spraying. After the mortar hardens, mortar is coated again using a trowel, roller, or by spraying, as required. The mortar surface is preferably finished to have a certain degree of roughness. This rough surface serves to facilitate strong adhesion of the concrete or mortar to be placed later. Mortar coating 14 preferably has a thickness of 15 mm or less in order not to cause sagging on the vertical inner surface of mold 11.

Figure 3:
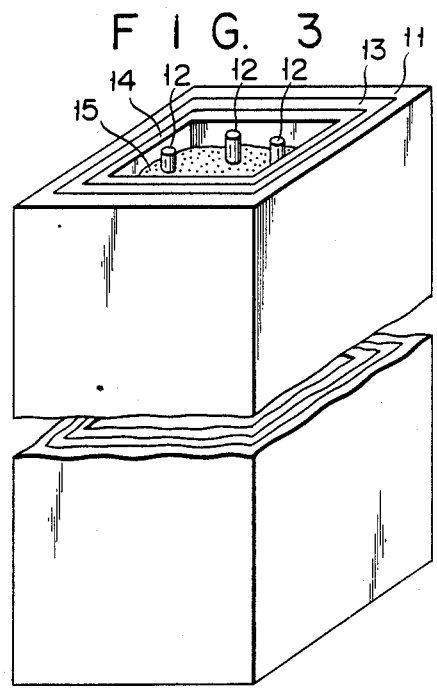
Figure 4:
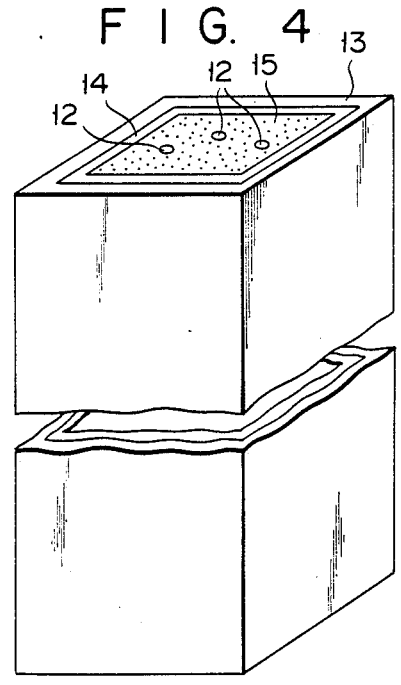

After forming strippable membrane 13 and transferring layer 14 on the inner surface of mold 11, concrete or mortar 15 is placed in mold 11 and cured by a conventional method (FIG. 3). Upon placing concrete or mortar 15, strippable membrane 13 on the inner surface of mold 11 is caused to adhere to the concrete or mortar surface by means of transferring layer 14. When mold 11 is removed in this state, strippable membrane 13 separates from mold 11 and adheres to the surface of concrete or mortar 15 through transferring layer 14. Thus, the surface of concrete or mortar 15 is protected by strippable membrane 13 (FIG. 4). In particular, when transferring layer 14 is formed from mortar containing a high-polymer emulsion or dispersion, it has high adhesion strength to concrete or mortar, as well as low water absorption, excellent water impermeability, and high resistance to permeation of chlorine ion, thereby satisfactorily protecting concrete or mortar 15.

Experimental Examples and Examples of the present invention will be described below.

EXPERIMENTAL EXAMPLE 1

"Metal coat" (trade name; available from Fine Chemical Japan Inc.) containing an ethylene-vinyl acetate copolymer-paint as its main component was used as a strippable paint. "Effect" (trade name; available from K.K. Onoda) containing an ethylene-vinyl acetate copolymer emulsion as a main component was used to form a transferring layer. Steel molds were used, and the transferring layer was coated 2 to 4 hours after coating of the strippable paint. Mortar and concrete were separately placed in the molds in the curing room of a temperature of 20° C. and humidity of 90%. The molds were removed from the mortar the day after placement, and were removed from the concrete two days after placement. Next, the concrete and mortar samples obtained were placed and dried in the curing room of a temperature of 20° C. and a humidity of 60%. The strippable paint was separately coated on the top surface of each sample after removal of the mold from the sample.

(1) Tests for mortar or concrete strength, loss in weight, carbonated thickness, coefficient of static elasticity, creep coefficient, and drying shrinkage Mortar samples had dimensions of 4×4×16 cm and contained 1 part by weight of cement and 2 parts by weight of Toyoura standard sand, with the water-cement ratio being 65.0%. Concrete samples had dimensions of 10 (diameter)×20 (height) cm and had a unit cement content of 280 kg/m$^3$, a slump of 14 cm, and a watercement ratio of 60.0%.

Table 1 below shows the results obtained with the mortar samples, and Table 2 shows those obtained with the concrete samples.

Creep coefficient and drying shrinkage were tested using 10×10×40 cm concrete samples having a unit cement content of 300 kg/m$^3$, a slump of 6 cm, and a water-cement ratio of 47.7%. Table 3 shows the results obtained. Precuring was performed in the curing room of a temperature of 20° C. and a humidity of 90% for 7 days.

TABLE 1

| Item | 7 days Not formed | 7 days Formed | 28 days Not formed | 28 days Formed | 91 days Not formed | 91 days Formed |
|---|---|---|---|---|---|---|
| Bending strength (kgf/cm$^2$) | 43 | 54 | 47 | 59 | 52 | 72 |
| Compression strength (kgf/cm$^2$) | 185 | 254 | 191 | 394 | 219 | 411 |
| Loss in weight (%) | −8.19 | 0.95 | −8.81 | −2.78 | −9.09 | −5.20 |
| Carbonated thickness (mm) | 2.7 | 0 | 6.3 | 0 | 11.1 | 0.3 |

TABLE 2

| Item | 7 days Not formed | 7 days Formed | 28 days Not formed | 28 days Formed | 91 days Not formed | 91 days Formed |
|---|---|---|---|---|---|---|
| Compression strength (kgf/cm$^2$) | 201 | 225 | 213 | 300 | 188 | 306 |
| Coefficient of static elasticity (× 10 kgf/cm$^2$) | 17.6 | 23.5 | 16.7 | 26.3 | 14.2 | 24.4 |
| Loss in weight (%) | −2.34 | −0.92 | −3.13 | −1.58 | −3.32 | −2.36 |
| Carbonated thickness (mm) | 1.8 | 0 | 6.0 | 0 | 8.8 | 0 |

TABLE 3

| Age | Membrane | Creep Coefficient | Drying Shrinkage (× 10$^4$) |
|---|---|---|---|
| 1 day | Not formed | 0.41 | 0.48 |
|  | Formed | 0.22 | −0.04 |
| 3 days | Not formed | 0.51 | 1.56 |
|  | Formed | 0.25 | 0.96 |
| 7 days | Not formed | 0.66 | 2.86 |
|  | Formed | 0.46 | 1.42 |
| 14 days | Not formed | 0.74 | 4.36 |
|  | Formed | 0.57 | 2.20 |
| 28 days | Not formed | 0.88 | 6.56 |
|  | Formed | 0.71 | 4.04 |
| 56 days | Not formed | 1.25 | 7.80 |
|  | Formed | 0.91 | 6.10 |
| 91 days | Not formed | 1.46 | 8.72 |
|  | Formed | 1.13 | 7.60 |

(2) Tests for water absorption of mortar

Mortar samples were prepared following the same procedures as for the tests in item (1) above. After removal of molds, the samples were wet cured for 28 days. The samples were subjected to outdoor exposure for 1 and 3 months, and were then subjected to the water absorption test in accordance with the JIS A 1404. The results obtained are shown in Table 4. As a Comparative Example, an impregnating waterproofing agent, "Chemistop" (available from Mitsui Petrochemical Inc. and having an acrylic resin as its main component), and "Spanguard" (available from Showbond Kensetsu Inc. and having a silicone as its main component) were used instead of the strippable paint. The results obtained with the Comparative Example samples are also shown in Table 4. The numbers in the table are in units of %.

TABLE 4

| Age | Coating | Water Absorption Time 1 hour | 5 hours | 24 hours |
|---|---|---|---|---|
| 1-month exposure | No coating | 5.86 | 11.43 | 12.34 |
|  | Chemistop | 0.87 | 1.77 | 3.46 |
|  | Spanguard | 0.26 | 0.44 | 0.85 |
|  | Strippable paint | 0.14 | 0.30 | 0.74 |
| 3-month exposure | No coating | 2.91 | 8.19 | 10.71 |
|  | Chemistop | 1.98 | 5.27 | 11.41 |
|  | Spanguard | 0.34 | 0.86 | 2.30 |
|  | Strippable paint | 0.05 | 0.17 | 0.59 |

(3) Tests for chlorine ion permeation property of mortar

Samples having a size of 5 (diameter) × 10 (height) cm were prepared following the same procedures as described above, except that columnar molds were used. After curing in air for 7 days, the samples were soaked in a 5% NaCl aqueous solution and were removed from the solution at different ages. Each sample was split into two portions. The split surfaces of the sample were sprayed with a 0.2% fluorescein sodium aqueous solution and a 0.1N silver nitrate aqueous solution, respectively. The portions which turned white upon spraying were determined to be chlorine ion-permeated regions, and the average permeation depth (mm) of these regions was determined for each age. The obtained results are shown in Table 5 below.

TABLE 5

| | Age | | | | | |
|---|---|---|---|---|---|---|
| | 1 day | 3 days | 7 days | 14 days | 28 days | 91 days |
| No coating | 8.9 | 10.1 | 11.1 | 12.0 | 14.4 | 24.5 |
| Spanguard | 1.2 | 1.7 | 2.2 | 2.5 | 2.7 | 3.5 |
| Strippable paint | 0 | 0.3 | 0.6 | 0.7 | 1.9 | 2.3 |

EXAMPLE 1

A plywood mold was finished into a slab, and reinforcing steel was arranged in the mold. Since the mold was made of wood, machine oil was coated as a releasing agent on the inner surface of the mold at a rate of 150 g/m$^2$, and was allowed to sufficiently permeate into the surface of the plywood. The coating was performed by spraying through gaps between reinforcing steel members. In the prior art, concrete is placed in the mold in this state. However, in this Example, the strippable paint was applied on the inner surface of the mold, so as to form a strippable membrane "Metal coat" (trade name; available from Fine Chemical Japan Inc.) having an ethylene-vinyl acetate copolymer as its main component was used as the strippable paint. The paint was coated, using a spray gun, through the gaps between the reinforcing steel members at a rate of 500 cc/m$^2$. Spraying was performed in two to three steps to prevent sagging. In this Example, the process up to this step was performed the day before the placement of concrete On the following day, a transferring agent was coated, using a spray gun, on the strippable membrane, to form a transferring layer. The transferring agent was prepared by diluting "Effect" (trade name; available from K.K. Onoda), having an ethylene-vinyl acetate copolymer emulsion as its main component, with the same amount of water and adding 0.1 to 3% by weight of a surfactant to the resultant solution Polyoxyethylene nonylphenyl ether ("Emalgen 910": trade name; available from Kao Corp.) was used as the surfactant. Since the transferring layer turned from white to transparent within 2 to 4 hours after application, concrete was placed thereafter. When the mold was removed after 7 days, the membrane had uniformly transferred onto the concrete surface, thereby forming a protective layer on the entire surface of the concrete which was in contact with the mold.

EXAMPLE 2

A sample was prepared following the same procedures as in Example 1, except that natural rubber latex was used to form the transferring layer. As a result, a protective layer was formed on the entire surface of the concrete which was in contact with the mold. When the protective layer was removed from the concrete after 1 month, it could be easily separated.

EXPERIMENTAL EXAMPLE 2

"Boncoat ST-372" (trade name; available from DAI-NIPPON INK & CHEMICALS, INC.) having acryl as its main component was used as a strippable paint. "Onoda CX-B" (trade name; available from K.K. Onoda) having a styrene butadiene rubber latex as its main component was used as a high-polymer dispersion to prepare mortar-dispersion having the mix proportion shown in Table 6. The mix proportion of concrete was as shown in Table 7, and normal Portland cement was used as the cement. The molds used were made of steel, except for one used for (5) tests for a chlorine ion-permeation property. About three hours after the strippable paint was coated twice, using a brush, mortar containing the high-polymer dispersion of the mix proportion in Table 6 was coated to a thickness of 1 to 3 mm, using a roller (a brush was used for (5) tests). The protective layer was formed on the inner surface of each mold the day before the placement of concrete or mortar. The concrete or mortar was placed in the curing room of a temperature of 20° C. and a humidity of 90%.

TABLE 6

| | Unit content (kg/m$^3$) | | | | |
|---|---|---|---|---|---|
| Water-cement ratio (%) | Water | Cement | Aggregate (1) | Onoda CX-B (solid content) | High-range water reducing agent (2) |
| 24.8 | 217 | 880 | 880 | 132 | 18 |

(Note)
(1) Mountain sand having a maximum grain size of 2.5 mm was used.
(2) "Mighty 150" (trade name; available from Kao K.K.) was used.

TABLE 7

| | | | | Unit content (kg/m$^3$) | | | |
|---|---|---|---|---|---|---|---|
| Slump (cm) | Air content (%) | Water-cement ratio (%) | Aggregate content (%) | Water | Cement | Aggregate (1) | Coarse aggregate (2) | Water-reducing agent (3) |
| 21 | 4 | 58.1 | 46.5 | 180 | 310 | 837 | 971 | 0.78 |

(Note)
(1) Pit sand having a maximum grain size of 5 mm was used.
(2) River gravel having a maximum pebble size of 25 mm was used.
(3) "Pozolis No. 5L" (trade name; available from Posolis Bussan K.K.) was used.

(1) Water permeation test for mortar

The water permeation test for mortar was performed in accordance with JISA 1404. The test was performed for four types of samples, each having a size of 15 (diameter)×4 (thickness) cm. The first type of sample was prepared from basic normal mortar having a water-cement ratio of 80%, a flow value of 160, and a ratio of cement to fine aggregate of 1 : 3 (to be referred to as "sample without protective layer" hereinafter). The second type of sample was prepared by forming a membrane of the strippable paint after removing the basic mortar from the mold (to be referred to as "sample with coating membrane"). The third type of sample was prepared by forming a layer of mortar containing a high-polymer dispersion, after removing the basic mortar mold the form (to be referred to as "sample with covering membrane"). The fourth type of sample was prepared by forming a protective layer on the basic mortar by transferring a strippable layer and a transferring membrane of mortar containing a high-polymer dispersion according to the present invention (to be referred to as "sample with protective layer"). Each sample was subjected to the water permeation test at a water pressure of 3 kg/cm$^2$. The obtained results are shown in Table 8.

TABLE 8

| | Sample | | | |
|---|---|---|---|---|
| | Without protective layer | With Coating membrane | With Covering membrane | With Protective layer |
| Amount of water permeation (g) | 107.0 | 58.6 | 4.5 | 0.9 |
| Water permeation ratio (%) | 100 | 54.8 | 4.2 | 0.8 |
| Permeation depth (cm) | 4.0 | 2.5 | 0.4 | 0 |

(2) Adhesion test of protective layer

Protective layers according to the present invention were formed on the inner surfaces of molds in the form of sidewalk plates having a size of 30×30×5 cm. Concrete having the composition shown in Table 7 was placed in the molds. Following the removal of the molds after 2 days, the concrete samples were cured in the curing room of a temperature of 20° C. and a humidity of 60%. Each sample was subjected to a test for checking the adhesion between the concrete and the protective layer, by using a "Kenken-type" tensile strength tester. The adhesion strength test was performed for a sample in which a tensile attachment was mounted on a square sample surface area of 4×4 cm with 1-cm deep cuts, and for a sample in which a tensile attachment was directly mounted on a flat surface of the sample. The same test was performed for samples which were left to stand for 28 days after the placement of concrete. The results obtained with the adhesion strength test are shown in Table 9. Referring to Table 9, in the column relating to the sample with cuts, each value indicates the value when the protective layer was separated by tearing at the 1-cm deep cuts. In the column relating to the sample without cuts, each value indicates the value when the protective layer was forcibly separated near the surface and represents the actual adhesion strength between the concrete and the protective layer

TABLE 9

| | Sample with cuts | Sample without cuts |
|---|---|---|
| Age 7 days | 28 (kgf/cm²) | 36 (kgf/cm²) |
| Age 28 days | 29 (kgf/cm²) | 40 (kgf/cm²) |

(3) Tests for shrinkage and cracking upon drying

The tests for shrinkage and cracking upon drying were performed in accordance with the original JIS method, a method (draft) of testing the shrinkage and cracking upon drying of concrete described in Corporate Juridical Person Nihon Concrete Kogakukyokai, "Concrete Kogaku", Vol. 23, No. 3, pp. 50-51 (Mar. 1, 1985). The constraining tool used consisted of small groove section steel complying with JISG 3350 and having a size of 25×102×10 cm. The concrete was placed such that the minimum sectional area was 10×10 cm. For measurement of the free shrinkage strain, samples having a size of 10×10×40 cm were used. The restrained and free shrinkage strains were measured for samples using the concrete having the mix proportion shown in Table 7 with and without a transferred protective layer consisting of a strippable membrane and a transferring agent according to the present invention.

The nonprotected top surface of the sample with the protective layer was treated into a state substantially the same as the protective layer, by coating mortar of the mix proportion shown in Table 6 with a trowel, on the day following the placement of the concrete, and thereafter coating it with a strippable paint, using a brush. The test was performed by curing the samples in the molds in the curing room of a temperature of 20° C. and a humidity of 0% for 7 days, and thereafter in the curing room of a temperature of 20° C. and a humidity of 60%. The obtained results are shown in Table 10.

TABLE 10

| | No. of days for drying | 1 | 2 | 4 | 7 |
|---|---|---|---|---|---|
| Protective layer not formed | Restrained shrinkage strain (× 10⁻⁶) | 20 | 27 | 33 | 54 |
| | Free shrinkage strain (× 10⁻⁶) | 60 | 92 | 142 | 211 |
| | Shrinkage stress (kgf/cm²) | 3.3 | 4.5 | 5.5 | 9.0 |
| | Constraint (%) | 66.7 | 70.7 | 76.8 | 74.4 |
| | No. of days until cracking | | 9 to 11 | | |
| Protective layer formed | Restrained shrinkage strain (× 10⁻⁶) | 14 | 17 | 23 | 44 |
| | Free shrinkage strain (× 10⁻⁶) | 0 | 17 | 33 | 52 |
| | Shrinkage stress (kgf/cm²) | 2.3 | 2.8 | 3.8 | 7.3 |
| | Constraint (%) | — | 0 | 30.3 | 15.4 |
| | No. of days until cracking | | 33 to 35 | | |

| | No. of days for drying | 10 | 14 | 28 | 35 |
|---|---|---|---|---|---|
| Protective layer not formed | Restrained shrinkage strain (× 10⁻⁶) | 59 | — | — | — |
| | Free shrinkage strain (× 10⁻⁶) | 265 | 329 | 533 | 608 |
| | Shrinkage stress (kgf/cm²) | 10.0 | — | — | — |
| | Constraint (%) | 77.7 | — | — | — |
| | No. of days until cracking | | 9 to 11 | | |
| Protective layer formed | Restrained shrinkage strain (× 10⁻⁶) | 53 | 66 | 115 | 132 |
| | Free shrinkage strain (× 10⁻⁶) | 61 | 93 | 224 | 284 |
| | Shrinkage stress (kgf/cm²) | 8.8 | 11.0 | 19.1 | 21.9 |
| | Constraint (%) | 13.1 | 29.0 | 48.7 | 53.5 |
| | No. of days until cracking | | 33 to 35 | | |

(4) Tests for compression strength, coefficient of static elasticity, loss in weight, and carbonation The tests were performed using concrete having the mix proportion shown in Table 7 and samples having a size of 10 (diameter)×20 (height) cm. The tests were performed for samples with and without a transferred protective layer consisting of a strippable membrane and a transferring layer according to the present invention. The nonprotected top surface of the sample with the protective layer was treated by capping, using a conventional method and coating a strippable paint thereafter. The tests were performed by curing the samples to a predetermined age in the curing room of a temperature of 20° C. and a humidity of 90% for 2 days and in the curing room of a temperature of 20° C. and a humidity of 60% thereafter, with the top surface facing downward. The obtained results are shown in Table 11.

TABLE 11

| Item | Age | | | | | |
|---|---|---|---|---|---|---|
| | 7 days | | 28 days | | 91 days | |
| | * | ** | * | ** | * | ** |
| Compression strength (kgf/cm$^2$) | 194 | 230 | 215 | 310 | 181 | 313 |
| Coefficient of static elasticity ($\times 10^4$ kg/cm$^2$) | 19.2 | 25.4 | 19.1 | 25.5 | 15.5 | 26.4 |
| Loss in weight (%) | −3.08 | −1.13 | −3.90 | −2.46 | −4.09 | −3.24 |
| Carbonated thickness (mm) | 2.5 | 0 | 7.2 | 0 | 10.0 | 0 |

(Note)
*Protective layer not formed
**Protective layer formed (5) Tests for chlorine ion permeation A sample having a size of 50 (diameter)×5 (thickness) mm was clamped between two cell containers. One container held distilled water, and the other a 10% NaCl aqueous solution. The chlorine ion permeation was measured with an ion meter and the diffusion coefficient was calculated in accordance with the measurements obtained. Each mold used was obtained by applying grease to the edge of a vinyl chloride ring (5-mm thick edge) having an inner diameter of 50 mm and a depth of 5 mm, placing the ring on a glass plate and adhering the two. Samples with and without a protective layer consisting of a strippable membrane and a transferring layer according to the present invention were prepared using normal Portland cement having a water-cement ratio of 48.7% and mortar having a cement/fine aggregate ratio of 1 : 2. The samples were cured to an age of 7 days in the curing room of a temperature of 20° C. and humidity of 90%. The obtained results are shown in Table 12.

TABLE 12

| Sample without protective layer | $0.65 \times 10^{-8}$ (cm$^2$/s) |
|---|---|
| Sample with protective layer | $0.028 \times 10^{-8}$ (cm$^2$/s) |

EXAMPLE 3

Coated plywood was assembled into a square columnar mold with a horizontal beam, and reinforcing steel was arranged therein. Although the mold was made of wood, it had a smooth surface. Therefore, a releasing agent was not applied and a strippable paint was directly applied, using a brush. The strippable paint used was "Boncoat ST-372" (trade name; available from DAINIPPON INK & CHEMICALS, INC.) having an acryl as its main component, and was coated uniformly by use of a brush at a rate of 50 cc/cm$^2$. Coating was performed twice, the second coating being performed after the coating membrane of the first coating was hardened. Mortar containing a high-polymer dispersion was coated on the strippable membrane. "Onoda CX-B" (trade name; available from Onoda K.K.) having styrene butadiene latex as its main component was used as the high-polymer dispersion. The mortar had a water-cement ratio of 25% and a ratio of normal Portland cement to fine aggregate of 1 : 1. The "Onoda CX-B" was used in an amount of 15% by weight (solid content) based on the weight of the cement, and 2% by weight of a high-range water-reducing agent, "Mighty 150" (trade name; available from Kao Corp.) based on the cement weight, was added. In order to improve the strength, the water permeation property, and resistance to chlorine ion permeation of the mortar, a vacuum mixer was used. The mortar was formed, using rollers, into a first sheet having a thickness of about 1 mm, and a second layer having a thickness of about 10 mm was then added after the first layer had more or less hardened (after 2 hours). The process up to this point was performed on the day before the placement of concrete. After placing building concrete having a slump of 18 cm, the mold was removed after 3 days. The strippable membrane and the mortar layer had uniformly transferred onto the concrete surface, thereby forming a protective layer on the entire concrete surface which had been in contact with the mold. Due to the presence of the continuous strippable membrane, the concrete surface had excellent gloss, no pinholes, and excellent outer appearance.

According to the present invention, the surface of concrete or mortar placed in a mold is protected with a continuous, waterproof protective layer upon removal of the mold. Accordingly, water, sea wind, or splashes of sea water will not ingress into the concrete after removal of the mold, and the concrete or mortar structure will not suffer from cracking or the like. Since a protective layer is formed upon removal of mold, according to the present invention, the workability is much improved over the conventional methods of coating a membrane-forming material or paint after removal of the mold.

What is claimed is:

1. A method of forming a waterproof, protective layer with no pinholes on concrete or mortar, comprising:
    coating a strippable paint directly on an inner surface of mold without an intervening release agent to form a strippable membrane having a thickness of 10 μm to 100μm;
    forming a transferring layer on said strippable membrane capable of adhering said strippable membrane to concrete or mortar;
    placing concrete or mortar in said mold having said strippable membrane and said transferring layer applied to said inner surface of said mold;
    curing the concrete or mortar in said mold; and
    removing said mold from said cured concrete or mortar to provide a cured concrete or mortar to the surface of which is adhered said strippable membrane which forms said waterproof, protective layer.

2. The method according to claim 1, wherein said strippable paint contains, as a main component, at least one member selected from the group consisting of polyvinyl chloride, vinyl chloride-vinyl acetate copolymer, polyvinyl butyral, polyvinyl alcohol, ethylene-vinyl acetate copolymer, and acrylic resin.

3. The method according to claim 1, wherein said transferring layer comprises a high-polymer emulsion or dispersion.

4. The method according to claim 3, wherein said high-polymer emulsion or dispersion is one member selected from the group consisting of ethylene-vinyl acetate-vinyl chloride copolymer emulsion, acrylic ester-styrene copolymer emulsion, ethylene-vinyl acetate copolymer emulsion, acrylic ester emulsion, anionic-polymerized styrene-butadiene rubber latex, cationic-polymerized styrene-butadiene rubber latex, paraffin emulsion, asphalt emulsion, rubber asphalt emulsion, epoxy resin emulsion, nitrile rubber latex, natural rubber latex, chloroprene latex, and methyl methacrylate latex.

5. A method according to claim 1, wherein said transferring layer comprises mortar blended with a high-polymer emulsion or dispersion.

6. A method according to claim 5, wherein said mortar constituting said transferring layer is a mixture having an aggregate/cement weight ratio of 75 : 25 to 45 : 55.

7. A method according to claim 6, wherein said mortar constituting said transferring layer contains 2.0 to 8.0% by weight, solid cement, of said high-polymer emulsion or dispersion.

8. A method according to claim 7, wherein said high-polymer emulsion or dispersion is one member selected from the group consisting of ethylene-vinyl acetate-vinyl chloride copolymer emulsion, acrylic ester-styrene copolymer emulsion, ethylene-vinyl acetate copolymer emulsion, acrylic ester emulsion, anionic-polymerized styrene-butadiene rubber latex, cationic-polymerized styrene-butadiene rubber latex, paraffin emulsion, asphalt emulsion, rubber asphalt emulsion, epoxy resin emulsion, nitrile rubber latex, natural rubber latex, chloroprene latex, and methyl methacrylate latex.

* * * * *